May 17, 1955     T. P. HECKMAN     2,708,613
CONVERTIBLE UTILITY TABLE
Filed April 6, 1953
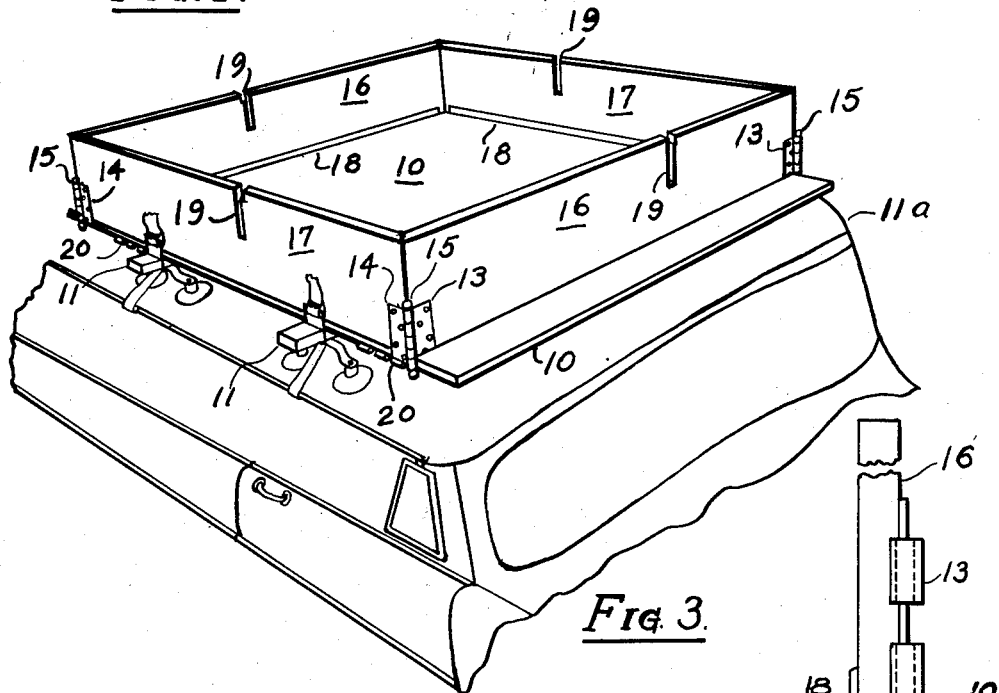
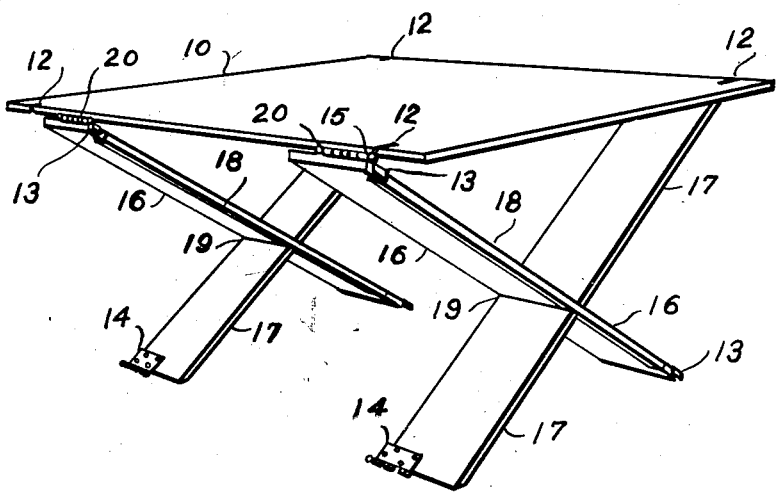
INVENTOR.
Thomas P. Heckman

United States Patent Office 2,708,613
Patented May 17, 1955

2,708,613

CONVERTIBLE UTILITY TABLE

Thomas P. Heckman, Castro Valley, Calif.

Application April 6, 1953, Serial No. 347,123

3 Claims. (Cl. 311—3)

This invention relates to a demountable carrier such as is used on the top of an automobile to receive and support luggage, camping equipment or other light packages and which may be disassembled and converted into a flat-topped table.

It is an object of this invention to provide a combination of elements that can be assembled to form different structures.

It is another object of this invention to provide means for assembling a light, strong and easily handled luggage carrier of the type described, to be received on a "ski-rack" or otherwise secured to the top of an automobile.

Another object is to provide means of this nature that can be assembled into a camp table of substantial area and stable construction.

These and other objects and advantages will be further apparent from the attached drawing, which forms a part of this specification and illustrates a preferred form of the invention which is described in detail in the following paragraphs.

In the drawing, Figure 1 is a perspective view of a luggage carrier embodying this invention, in place on the top of an automobile. Figure 2 is a perspective view of the device of Figure 1 that has been converted into a table. Figure 3 is a detail side view, to an enlarged scale, of a preferred means for securing the ends and sides to the bottom member of the carrier of Figure 1.

Referring to the drawing and particularly to Figure 1, reference numeral 10 designates a flat bottom member, desirably rectangular and made of light rigid material such as plywood, adapted to rest upon the parallel elements of a "ski-rack" or other means 11 for securing member 10 to the top of an automobile, which is generally designated 11a. The rack and the automobile form no part of the invention, and are merely shown to illustrate one mode of its utilization. On opposite sides of base 10 and near the ends are short slots 12 inclined together, and to the plane of the base which slots are also illustrated in Figure 3, and which co-act with means to be described below to hold the ends 16 and 17 of the carrier to the base member 10, when the several parts are assembled for this purpose.

On each end and at one side of each end member 16, which is desirably a rectangle of light material such as plywood, is secured a half of a butt hinge 13, one end of which has been bent inwardly as at 13a (Figure 3) to engage one of the downwardly and inwardly inclined slots 12 in the base member 10. On the adjoining ends of side members 17 are mating straight or unaltered halves of butt hinges 14, which may be secured to half-hinges 13 by the usual loose and removable metal pin 15. The lower straight ends of half-hinges 14 will necessarily overlap both side edges of bottom member 10, and thus prevent sideways or lateral displacement of the rectangular frame formed by the two end members 16 and the two side members 17 (Figure 1), which are secured together at their ends by half-hinges 13 and 14 and pins 15. The downwardly and inwardly inclined bent portions 13a of half-hinges 13 prevent endwise motion of the frame on the base 10 and also prevent upward motion tending to separate the frame from base member 10. The ends of members 16 and 17 are beveled as shown to make a secure joint.

Assembly of the arrangement just described is made by placing the end members 16 on base 10, the bent portions 13a of half-hinges 13 sliding downwardly into the inclined slots 12. The side members 17 are slid transversely into engagement with their respective end members, the half-hinges 14 mating with half-hinges 13, whereupon the insertion of the four loose pins 15 into the hinge elements secures the five parts to form a unitary structure.

Referring to Figure 2, flat member 10 has two sets of straight half-hinges 20 secured to its bottom surface and at opposite sides adjacent to slots 12. When the several parts are to be assembled to form a table, as shown in that figure, one half-hinge 13 of an end member 16 is pinned to one half-hinge 20 of member 10, and one half-hinge 14 of a side member 17 is pinned to the corresponding half-hinge 20 on the opposite side of member 10. Both the side and end members are slotted or notched as at 19 to permit each to intersect the other to form an X, so that, when both end members and both side members are so used, a stable flat-topped table will be produced.

Desirably, but not necessarily, each end member 16 and each side member 17 is reinforced against bending due to heavy loads on the table top 10 by the provision of a suitable light metal angle 18 secured to the unslotted edge of each member.

In conclusion, it will be appreciated that the cooperation of the several parts contribute to form either of two useful and novel structures, viz., a luggage carrier, or flat-bottom box, or a sturdy table. When the member 10 is the bottom of a box it has been so far designated a "base" and when it forms the usable space of a table it has been termed a "top." Generically, member 10 may be defined as "means forming an extended flat surface and opposed edges" and will be so designated in the following claims. Also, when the terms "hinges," or "butt hinges" are used, it is understood that equivalent forms of pin and gudgeon or other detachable connectors may be employed.

Although a single embodiment has been illustrated and described it is obvious that numerous changes could be made without departing from the essential features of the invention. Accordingly, all such changes and modifications that fall within the scope of the appended claims are intended to be embraced thereby.

I claim:

1. For the construction of structures of the character described, a flat member having a top and bottom face and two pairs of opposed edges, a slot in said member adjacent each end of one pair of opposed edges, and a half-hinge on the bottom face of said member adjacent each slot, a first pair of rectangular members each having a length substantially equal to the distance along the edge between one pair of said slots, a second pair of rectangular members of the same length as said first pair, a half-hinge at each end of said first pair of rectangular members, a portion of each of said last-named half-hinges projecting beyond an edge of said members to be engageable in said slots selectively to secure said rectangular members to the top face of said flat member, a half-hinge at each end of the second pair of rectangular members, and pin means for selectively connecting all the half-hinges of said rectangular members to secure them together, or to secure one half-hinge of each rectangular member to a corresponding half-hinge on the bottom face of said flat member.

2. A combination according to claim 1, in which each of said rectangular members is slotted transversely intermediate its length to intersect and connect with another rectangular member when said pin connecting means are in place to secure one half-hinge if each rectangular member to a corresponding half-hinge on the bottom face of said flat member.

3. A combination according to claim 1 in which the slots in said flat member and the projecting portion of the half-hinges of said first pair of rectangular members are both inclined with respect to the top face of said flat member.

References Cited in the file of this patent

UNITED STATES PATENTS

| | | |
|---|---|---|
| 179,961 | Root | July 18, 1876 |
| 1,785,450 | Laffille | Dec. 16, 1930 |
| 2,579,934 | Krasney | Dec. 25, 1951 |
| 2,654,516 | Edwards | Oct. 6, 1953 |